United States Patent
Chung et al.

(10) Patent No.: US 8,717,976 B2
(45) Date of Patent: May 6, 2014

(54) METHOD AND APPARATUS FOR TRANSMITTING CONTROL INFORMATION IN WIRELESS COMMUNICATIONS SYSTEM THAT SUPPORTS COORDINATED MULTI-POINT (COMP) INCLUDING MULTIPLE TRANSMISSION POINTS

(75) Inventors: Jae Hoon Chung, Anyang-si (KR); Ja Ho Koo, Anyang-si (KR); Moon Il Lee, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 13/145,679

(22) PCT Filed: Jan. 26, 2010

(86) PCT No.: PCT/KR2010/000462
§ 371 (c)(1),
(2), (4) Date: Jul. 21, 2011

(87) PCT Pub. No.: WO2010/085127
PCT Pub. Date: Jul. 29, 2010

(65) Prior Publication Data
US 2011/0286398 A1    Nov. 24, 2011

Related U.S. Application Data

(60) Provisional application No. 61/147,178, filed on Jan. 26, 2009.

(51) Int. Cl.
*H04W 4/00* (2009.01)
*G01R 31/08* (2006.01)
*H04B 7/00* (2006.01)

(52) U.S. Cl.
USPC ......... 370/328; 370/230; 370/277; 370/310.2

(58) Field of Classification Search
USPC ............................................. 370/328
See application file for complete search history.

(56) References Cited

U.S. PATENT DOCUMENTS

| | | | |
|---|---|---|---|
| 2008/0186916 A1 | 8/2008 | Oshiba et al. | |
| 2008/0242337 A1* | 10/2008 | Sampath et al. | 455/522 |
| 2009/0116573 A1* | 5/2009 | Gaal et al. | 375/267 |
| 2009/0323625 A1 | 12/2009 | Lee et al. | |
| 2011/0092242 A1* | 4/2011 | Parkvall et al. | 455/509 |
| 2012/0257577 A1* | 10/2012 | Chin et al. | 370/328 |

FOREIGN PATENT DOCUMENTS

| | | |
|---|---|---|
| KR | 2008-0083587 | 9/2008 |
| KR | 2008-0111393 | 12/2008 |

OTHER PUBLICATIONS

Parkvall et al., LTE-Advanced-Evolving LTE Towards IMT-Advanced, IEEE, Mar. 1-5, 2008.
International Search Report for PCT/KR2010/000462.

* cited by examiner

*Primary Examiner* — Faruk Hamza
*Assistant Examiner* — Abu-Sayeed Haque
(74) *Attorney, Agent, or Firm* — Morgan, Lewis & Bockius LLP

(57) ABSTRACT

The present system relates to a method for transmitting control information in a wireless communications system that supports coordinated multi-point (CoMP) including N (N>1) transmission points. The method comprises: generating control information for downlink transmission of the N transmission points; and transmitting the generated control information to a user device, wherein the control information contains a control information region for transmission of intrinsic control information on a reference transmission point among the N transmission points, and N−1 control information regions for transmission of intrinsic control information on the N−1 transmission points.

7 Claims, 4 Drawing Sheets

METHOD AND APPARATUS FOR TRANSMITTING CONTROL INFORMATION IN WIRELESS COMMUNICATIONS SYSTEM THAT SUPPORTS COORDINATED MULTI-POINT (COMP) INCLUDING MULTIPLE TRANSMISSION POINTS

The present application is a national stage of PCT International Application No. PCT/KR2010/000462 filed Jan. 26, 2010, and claims the benefit of U.S. Provisional Application No. 61/147,178, filed Jan. 26, 2009.

TECHNICAL FIELD

The present invention relates to a method for transmitting downlink control information in a wireless communications system that supports a coordinated multi-point (CoMP) including multiple transmission points and an apparatus for performing the method.

BACKGROUND ART

Recently, a multiple input multiple output (MIMO) system has received much attention as a broadband wireless communication technology. The MIMO system means a system that enhances communication efficiency of data by using a plurality of antennas. The MIMO system can be divided into a spatial multiplexing scheme and a spatial diversity scheme depending on transmission of same data.

The spatial multiplexing scheme means a scheme that can transmit data at high rate without even increasing a system bandwidth by simultaneously transmitting different data through a plurality of transmitting antennas. The spatial multiplexing scheme means a scheme that can obtain transmission diversity by transmitting same data from a plurality of transmitting antennas. An example of the spatial diversity scheme includes a space time channel coding scheme.

Also, the MIMO system can be divided into an open loop system and a closed loop system depending on feedback of channel information from a receiving side to a transmitting side. An example of the open loop system includes a space-time trellis code (STTC) system in which a transmitting side transmits information in parallel while a receiving side detects a signal by repeatedly using a zero forcing (ZF) scheme and a minimum mean square error (MMSE) scheme and obtains transmission diversity and encoding gain by using a blast and spatial area that can increase information as much as the number of transmitting antennas. An example of the closed loop system includes a transmit antenna array (TxAA) system.

FIG. 1 is a conceptional diagram illustrating a CoMP system of intra eNBs and an inter eNB according to the related art.

Referring to FIG. 1, intra base stations 110, 120 and inter base station 130 exist under a multi cell environment. According to a long term evolution (LTE) system, the intra base stations include several cells (or sectors). Cells that belong to a base station to which a specific mobile station belongs are in the relation of intra base stations 110, 120 with a specific mobile station. Namely, cells that share a base station to which a mobile station belongs are cells corresponding to the intra base stations 110 and 120 while cells that belong to other base stations are cells corresponding to the inter base station 130. In this way, although cells based on the same base station as that of a specific mobile station transmit and receive information (for example, data, channel state information (CSI)) through x2 interface, cells based on a base station different from that of a specific mobile station can transmit and receive information through a backhaul 140.

As illustrated in FIG. 1, a single cell MIMO user 150 located within a single cell performs communication with a single serving base station in one cell (sector), and a multi-cell MIMO user 160 located at the cell edge performs communication with a plurality of serving base stations in multiple cells (sectors).

A coordinated multi-point system (hereinafter, referred to as 'CoMP system') is the system for improving throughput of a user located at the cell edge by applying improved MIMO transmission under the multi-cell environment. If the CoMP system is applied, inter-cell interference can be reduced under the multi-cell environment. In case of the CoMP system, a mobile station can commonly be supported with data from multi-cell base stations. Also, each base station can improve system throughput by supporting same radio frequency resource to one or more mobile stations (MS1, MS2, . . . , MSK) at the same time. Also, the base station can perform a space division multiple access (SDMA) method based on channel state information (CSI) between the base station and the mobile station.

The CoMP system can be divided into a coordinated MIMO (Co-MIMO) type joint processing (JP) scheme through data sharing and a coordinated scheduling scheme/beamforming (CS/CB) scheme.

In the cooperative MIMO system, a serving base station and one or more cooperative base stations are connected with a scheduler through a backbone network. The scheduler can be operated in such a manner that channel information is fed back to the scheduler through the backbone network, wherein the channel information is measured by each of the base stations ($BS_1$, $BS_2$, . . . , $BS_M$) and relates to channel status information between each of the mobile stations (MS1, MS2, . . . , MSK) and the cooperative base station. For example, the scheduler schedules information for cooperative MIMO operation with respect to the serving base station and one or more cooperative base stations. Namely, the scheduler directly commands cooperative MIMO operation to each base station.

The CoMP system includes transmission processes (for example, multiple antennas) locally spaced apart from one another as well as the inter-cell joint processing and the coordinated scheduling scheme/beamforming scheme.

FIG. 2 is a diagram illustrating transmission of a physical downlink shared channel (PDSCH) and a physical downlink control channel (PDCCH) in a process of performing downlink CoMP system.

As illustrated in FIG. 2, some or all of individual transmission points (Tx points) may be configured within a random base station (eNodeB) or on different base stations. As illustrated in FIG. 2, if a total of N (N>1) transmission points (Tx points) exist, one transmission point is regarded as an anchor point (reference point), and the PDSCH is transmitted from the N transmission points, whereas the PDCCH is transmitted from the anchor point. This is to prevent overhead for receiving the PDCCH in a user equipment (UE) from occurring when considering that a control channel element (CCE) of the PDCCH and CCE of a resource element (RE) to RE mapping is configured differently per transmission point and the user equipment receives control information individually through blind decoding.

Since a downlink control information (DCI) format of the PDCCH transmitted through the anchor point includes full control information on PDSCH transmission of a total of N transmission points, payload size of the DCI format may be increased. This may cause deterioration of reliability in receiving the PDCCH due to increase of a useful code rate.

Accordingly, when the PDCCH of a single anchor point is transmitted with respect to PDSCH transmission of N transmission points of FIG. 2, a method for transmitting downlink CoMP for effective control signaling and a method for configuring control information should be considered.

DISCLOSURE

Technical Problem

An object of the present invention devised to solve the conventional problem is to provide a method for transmitting downlink CoMP for effective control signaling and a method for configuring control information when a PDCCH of a single anchor point is transmitted for PDSCH transmission of N transmission points, and an apparatus for performing the methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, a method for transmitting control information in a wireless communications system that supports coordinated multi-point (CoMP) including N (N>1) transmission points comprises generating control information for downlink transmission of the N transmission points; and transmitting the generated control information to a user equipment, wherein the control information includes a control information region for transmission of control information specific for a reference transmission point among the N transmission points, and N−1 control information regions for transmission of control information specific for each of the N−1 transmission points.

The control information further includes common control information region for transmission of control information common for the N transmission points.

The control information specific for the reference transmission point is included in the common control information region or the control information region for transmission of the control information specific for the reference transmission point, and each of the N−1 control information regions includes offset information on delta of control information on a corresponding transmission point with respect to the control information specific for the reference transmission point.

The control information is one of resource allocation control information, MCS (Modulation and Coding Scheme) level, HARQ (Hybrid Automatic Repeat reQuest) related information, PMI (Precoding Matrix Index) control information, and information on a transmission point, which is involved in the CoMP, among the N transmission points.

The control information is transmitted through a physical downlink control channel (PDCCH).

In another aspect of the present invention, a method for transmitting control information in a wireless communications system that supports coordinated multi-point (CoMP) including N (N>1) transmission points comprises grouping the N transmission points into M transmission point groups and generating control information for downlink transmission of M (M<N) transmission point groups; and transmitting the generated control information to a user equipment, wherein the control information includes M control information regions for transmission of control information specific for each of the M transmission points groups.

The control information further includes a common control information region for transmission of control information common for the M transmission point groups.

The control information on a reference transmission point among the N transmission points is included in the common control information region or a control information region for transmission of control information specific for a group including the reference transmission point, and each of M−1 control information regions includes offset information on delta of control information on a corresponding group with respect to the control information specific for the including the reference transmission point.

The control information is one of resource allocation control information, MCS (Modulation and Coding Scheme) level, HARQ (Hybrid Automatic Repeat reQuest) related information, PMI (Precoding Matrix Index) control information, and information on a transmission point, which is involved in the CoMP, among the N transmission points.

The control information is transmitted through a physical downlink control channel (PDCCH).

Advantageous Effects

According to the embodiments of the present invention, overhead of downlink control signaling can be reduced in the CoMP system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings, so that a person with an ordinary skill in the art to which the present invention pertains can easily carry out the embodiments. However, it is to be understood that various modifications can be made in the present invention and the present invention is not limited to the following description. In order to clarify the present invention, parts which are not related with the description will be omitted from the drawings, and wherever possible, the same reference numbers will be used throughout the drawings to refer to the same or like parts.

In this specification, when some part "includes" some elements, it means that the part can further include other elements unless mentioned to the contrary. Also, terminologies " . . . part," " . . . block," and " . . . module" mentioned in this specification mean a unit processing at least one function or operation, and can be implemented by hardware, software or combination of hardware and software.

Hereinafter, in a CoMP system including N (N>1) transmission points, a method for configuring control information on a PDCCH will be described.

Embodiment 1

Figure 1:
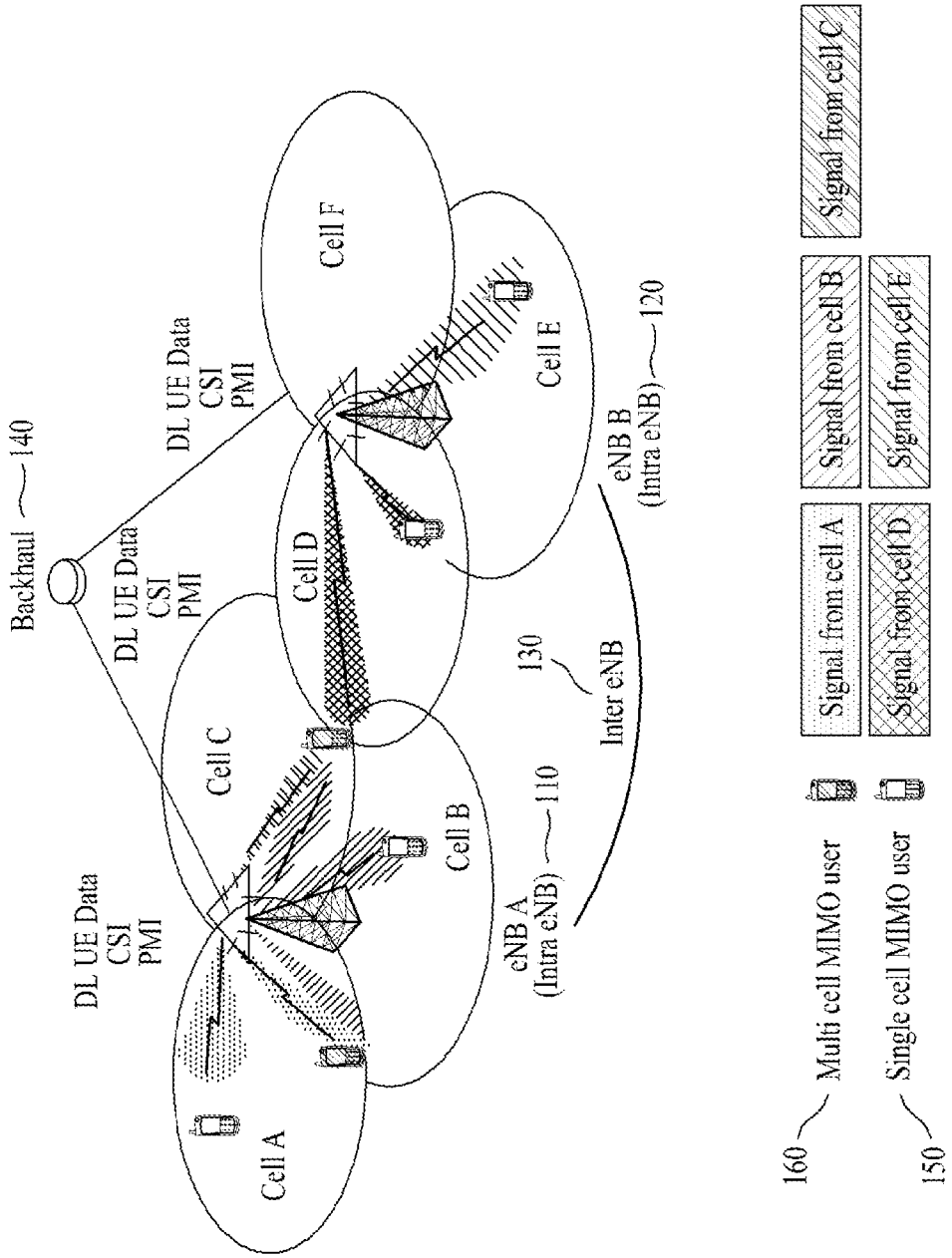
FIG. 1 is a conceptional diagram illustrating a CoMP system of intra eNBs and an inter eNB according to the related art.
Figure 2:
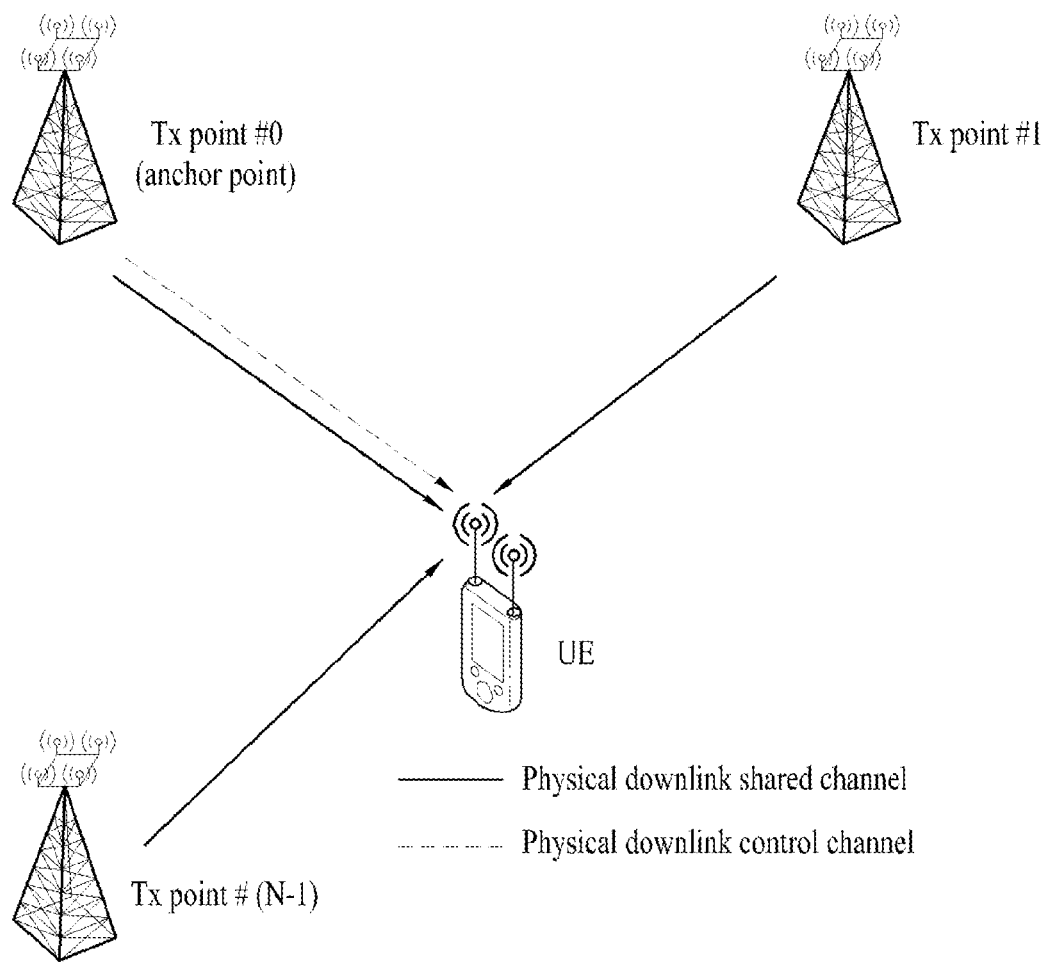
FIG. 2 is a diagram illustrating transmission of a physical downlink shared channel (PDSCH) and a physical downlink control channel (PDCCH) in a process of performing downlink CoMP system.
Figure 3:
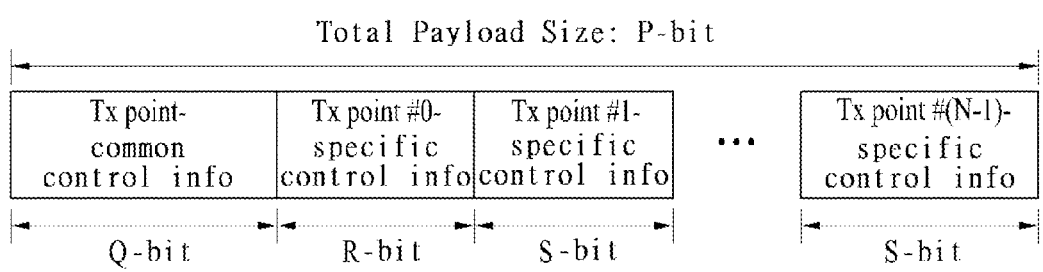
FIG. 3 is a diagram illustrating a structure of control information on a PDCCH in a CoMP system including N transmission points according to the embodiment 1 of the present invention.

FIG. 3 is a diagram illustrating a structure of control information on a PDCCH in a CoMP system including N transmission points according to the embodiment 1 of the present invention.

As illustrated in FIG. 3, a total payload size of control information according to the present invention corresponds to P bit. Also, the control information includes a Tx point common control information region of Q bit, a reference point (Tx point #0) intrinsic (or specific) control information region of R bit, and N−1 other transmission points (Tx point#1 to Tx point #N−1) intrinsic (or specific) control information regions of S bit.

This embodiment includes the case where no Tx point common control information exists (that is, the case where Q is 0 bit), and a bit size R of the control information on the reference transmission point (Tx point#0) may be the same as a bit size S of the other transmission points intrinsic (or specific) control information. If control information on PDSCH transmission of the reference transmission point is additionally defined, the bit size R of the control information on the reference transmission point may be varied.

The basic method for configuring control information as suggested in this embodiment is a method for indicating control information explicitly per transmission point without Tx point common control information. In other words, every kind of control information excluding a CoMP mode indication bit is configured per individual transmission point. However, in this case, a total size of full CoMP transmission related control information may be increased excessively.

Accordingly, this embodiment suggests a method for configuring control information for effective control signaling.

Hereinafter, a method for applying a transmission structure of the aforementioned control information to the following control information will be described.

(1) Resource Allocation Control Information

Physical resources (for example, sub-bands or subcarriers in a frequency domain in case of FDM) used for PDSCH transmission per individual transmission point may be set equally or differently. In this case, it is preferable that a common physical resource for PDSCH transmission is allocated to each transmission point to configure effective control information according to this embodiment. At this time, resource allocation control information for allocating the common physical resource can be configured as the Tx point common control information. Accordingly, the resource allocation control information can be located in the Tx point common control information region in FIG. 3.

In the mean time, if downlink CoMP is used, the resource allocation control information on the reference transmission point is located in the Tx point common control information region or the reference transmission point (Tx point #0) intrinsic (or specific) control information region by considering gain through individual link adaptation per transmission point, and offset information (that is, information on difference (delta) in the resource allocation control information on the reference transmission point) on delta of a location or size of a resource block of the other transmission points (Tx point #1 to Tx point #N−1) for the resource allocation control information on the reference transmission point can be located in each transmission point intrinsic (or specific) control information region.

In the mean time, full resource allocation control information on each transmission point can be located in the intrinsic (or specific) control information region of the corresponding transmission point.

(2) Modulation and Coding Scheme (MCS) Related Control Information

A method for configuring MCS related control information can be varied depending on whether a single MCS or an intrinsic (or specific) MCS per individual transmission point is applied to PDSCH transmission of full transmission points. For configuration of effective control information, it is preferable that a common MCS value for PDSCH transmission is allocated to each transmission point. At this time, common MCS related control information on each transmission point for PDSCH transmission can be configured as Tx point common control information. Accordingly, the MCS related control information can be located in the Tx point common control information region in FIG. 3.

On the other hand, for gain through individual link adaptation per transmission point, the MCS related control information on the reference transmission point can be located in the Tx point common control information region or the reference transmission point (Tx point #0) intrinsic (or specific) control information region, and information on delta of the MCS value on the other transmission points of the MCS value included in the MCS information on the reference transmission point can be located in the corresponding transmission point intrinsic (or specific) control information region as offset information (that is, information on delta of the MCS value of the reference transmission point).

In the mean time, full MCS related control information on each transmission point can be located in the intrinsic (or specific) control information region of the corresponding transmission point.

(3) Hybrid Automatic Repeat Request (HARQ) Related Control Information

Basically, examples of HARQ related control information on PDSCH transmission include a HARQ process number, a new data indicator (NDI), and redundancy version (RV). When the aforementioned examples are defined as the HARQ related control information, if downlink CoMP is used, a method for configuring HARQ related control information according to this embodiment can be varied depending on whether single HARQ related control information or individual HARQ related control information per transmission point is applied to PDSCH transmission of full transmission points.

For configuration of effective control information, it is preferable that common HARQ related information for PDSCH transmission is allocated to each transmission point. At this time, the common HARQ related control information can be configured as the Tx point common control information. Accordingly, the HARQ related control information can be located in the Tx point common control information region in FIG. 3.

However, if an independent HARQ process is used by an independent packet scheduler per transmission point, since expected gain is great, the HARQ related control information on the reference transmission point can be located in the Tx point common control information region or the reference transmission point (Tx point #0) intrinsic (or specific) control information region, and information on delta of HARQ control information on the other transmission points with respect to the HARQ related control information on the reference transmission point can be located in the individual transmission point intrinsic (or specific) control information region as offset information (that is, information on delta of a value per corresponding field of the HARQ related control information of the other transmission point with respect to a value per field of the HARQ related control information on the reference transmission point).

Also, the full HARQ related control information per transmission point may be located in the individual transmission point intrinsic (or specific) control information region.

(4) Precoding Matrix Index (PMI) Control Information

For application of downlink CoMP, a MIMO precoding type through a precoding matrix can be used. At this time, a PMI among full transmission points can be expressed as either a random PMI value defined in view of the number of full transmitting antennas defined in the system or a random PMI applied randomly by the base station. In a transmission system of this downlink CoMP, a sub-rank of column vectors is allocated from a random PMI, which is applied to full transmission, to the individual transmission point. In order to embody this, indication (that is, indication of the order of column vectors) of a series of streams can be designated per individual transmission point.

The applied PMI value can be located in the Tx point common control information region, and stream indication information per transmission point can be located in the corresponding region as the Tx point common control information together with explicit indication or implicit indication (that is, method for arranging stream indication information based on the order of indexes among transmission points) of the transmission point. Unlike this, the PMI value may not be transmitted separately, and stream indication information per transmission point can be located in the corresponding region as the Tx point common control information together with explicit indication or implicit indication (that is, method for arranging stream indication information based on the order of indexes among transmission points) of the transmission point. Also, a total of streams may be located as the Tx point common control information and stream indication information per transmission point may be located in the control information region with respect to the individual transmission point.

As a method for the explicit indication, stream indexes or stream ordering may directly be defined as a field. The number of streams used for transmission per transmission point is defined in the common control information region or the individual control information region as the method for explicit indication, and as a method for the implicit indication, stream indexes may be designated in due order as much as the number of streams per transmission point in accordance with the index order among the transmission points involved in transmission.

Also, the corresponding indication information may be located in the individual transmission point intrinsic (or specific) control information region.

As a method for application of another type PMI on the downlink CoMP, a PMI used for MIMO transmission under a single cell non-CoMP status per transmission point can be applied to PDSCH transmission per transmission point. In this CoMP method, the PMI value per transmission point can basically be indicated to the mobile station through the Tx point intrinsic (or specific) control information region. If another PMI value is transmitted through precoding to a reference signal for data demodulation, a separate PMI value is not needed to be indicated, and a total of streams for CoMP transmission, the number of streams per transmission point, or indexes of the streams per transmission point can be transmitted to the common control information region or the individual control information region.

As another method different form the aforementioned method, the PMI value can be located in the corresponding region as the Tx point common control information together with explicit indication or implicit indication (that is, method for arranging stream indication information based on the order of indexes among transmission points) of the transmission point. Unlike this, the PMI value may not be transmitted separately, and stream indication information per transmission point can be located in the corresponding region as the Tx point common control information together with explicit indication or implicit indication (that is, method for arranging stream indication information based on the order of indexes among transmission points) of the transmission point. Also, a total of streams may be located as the Tx point common control information and stream indication information per transmission point may be located in the control information region with respect to the individual transmission point.

As a method for the explicit indication, stream indexes or stream ordering may directly be defined as a field. The number of streams used for transmission per transmission point is defined in the common control information region or the individual control information region as the method for explicit indication, and as a method for the implicit indication, stream indexes may be designated in due order as much as the number of streams per transmission point in accordance with the index order among the transmission points involved in transmission.

(5) Active Set Indication

The mobile station may be indicated identifiers of transmission points involved in downlink CoMP. In this case, information of the identifiers is defined as an active set of the corresponding CoMP transmission. This information may be set cell-specifically or differently per user equipment. Elements constituting the information may be values of intrinsic (or specific) cell ID of the transmission point, and may be configured as index of information obtained through ordering of cell IDs among logical or virtual transmission points on the full active set, a series of rules, or equation.

This information can basically be configured in such a manner that full information of index values corresponding to identifiers of the transmission points on the active set in the control information on the PDCCH is defined as the Tx point common control information. Also, full ID (or index) values on the active set with respect to the reference transmission point are transmitted through the Tx point intrinsic (or specific) control information region or the reference transmission point intrinsic (or specific) control information region, and a relative value of ID (or index) value of the individual transmission point with respect to the full ID values on the active set with respect to the reference transmission point can be located in the individual transmission point intrinsic (or specific) control information region as an offset value.

Candidate information of the transmission points that can be involved in downlink CoMP can be transmitted previously as cell-specific system information through higher layer signaling (that is, radio resource control signaling) or user equipment-specific higher layer signaling (radio resource control signaling).

For identification of the active set per transmission point on the PDCCH, the aforementioned information can be used as a reference of logical index.

In the mean time, the number of transmission points (that is, the number of elements of the active set) involved in CoMP may only be indicated without separate designation on the Tx point common control information region, and index information of the transmission point of the corresponding active set on the transmission point intrinsic (or specific) control information region can be indicated.

(6) Other Control Information

In accordance with the detailed method of downlink CoMP, transmission power control (TPC) command information on the PUCCH, PMI confirmation information, and localized/distributed flag information can be transmitted as the Tx point common control information, or can be transmitted to the user equipment through the individual transmission point intrinsic (or specific) control information region to ensure individual independence for resource allocation, link adaptation and PMI application between the transmission points.

In configuring a random downlink control information (DCI) format by means of the suggested methods on the Tx point common control information, the transmission point intrinsic (or specific) control information, or hybrid type Tx point common control information and transmission point intrinsic (or specific) control information, as suggested on the individual control information that can be transmitted through the PDCCH, the suggested details per control information suggested as above can independently be applied per control information. Accordingly, a full DCI format of PDCCH transmission on the reference transmission point of corresponding downlink CoMP can be configured through combination of the suggested details, and can also be applied to PDCCH transmission of another type downlink CoMP.

Embodiment 2

Unlike the method described in the embodiment 1, as a method for configuring control information on a PDCCH, there is suggested a method for applying a transmission point group intrinsic (or specific) control information region by grouping N transmission points into M (<N) transmission point groups based on the same transmission mode as that of N transmission points.

Figure 4:
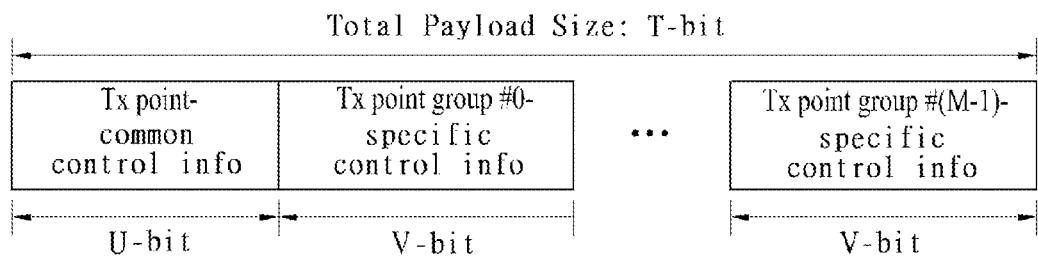
FIG. 4 is a diagram illustrating a structure of control information on a PDCCH in a CoMP system including M transmission groups according to the embodiment 2 of the present invention.

FIG. 4 is a diagram illustrating a structure of control information on a PDCCH in a CoMP system including M transmission points according to the embodiment 2 of the present invention.

As illustrated in FIG. 4, a total payload size of control information according to the present invention corresponds to T bit. Also, the control information includes a Tx point common control information region of U bit, and M transmission points (Tx point #0 to Tx point group #M−1) group intrinsic (or specific) control information regions of V bit.

This embodiment includes the case where no Tx point common control information exists (that is, the case where U has a size of 0). In order to reduce overhead of full control information of full downlink CoMP, this embodiment suggests a method for equalizing a PDSCH transmission system between transmission points within a corresponding group by grouping transmission points for PDSCH transmission into M groups using same control information or previously grouping transmission points into M groups in accordance with a random rule.

As a detailed method for implementing downlink CoMP, a method for configuring downlink CoMP through combination of groups of basic transmission points previously configured based on measurement of the user equipment or information on other network can be considered. Also, a method for identifying transmission points involved in downlink CoMP and grouping the identified transmission points can be considered.

Of the aforementioned methods, as the most basic method for configuring control information, as suggested in this embodiment under downlink CoMP, there can be considered a method for configuring all kinds of control information excluding CoMP mode indication bit per transmission point group only if Tx point common control information is not defined and control information is indicated explicitly.

However, in this case, a total size of full CoMP transmission related control information may be increased excessively. Accordingly, a method for configuring control information for effective control signaling and a method for CoMP transmission based on the method for configuring control information can be implemented through configuration of the Tx point common control information.

Hereinafter, a method for configuring control information per type as Tx point common control information and a detailed method for downlink CoMP transmission based on the method for configuring control information will be described.

(1) Resource Allocation Control Information

Physical resources (for example, sub-bands or subcarriers in a frequency domain in case of FDM) used for PDSCH transmission per individual transmission point group may be set equally or differently in accordance with a detailed method for application of downlink CoMP and a method for embodying gain expected through the detailed method. In this case, it is preferable that a common physical resource for PDSCH transmission is allocated to each transmission point to configure effective control information according to this embodiment. At this time, resource allocation control information can be configured as the Tx point common control information.

In the mean time, if downlink CoMP is used, the resource allocation control information of the transmission point group including a reference transmission point is located in the Tx point common control information region or the reference transmission point group (Tx point group #0) intrinsic (or specific) control information region considering gain through individual link adaptation per transmission point group, and offset information (that is, information on delta in the resource allocation control information of the reference transmission point) on delta of a location or size of a resource block of the other transmission point groups (Tx point group #0 to Tx point group #M−1) can be located in each transmission point group intrinsic (or specific) control information region.

Alternatively, full resource allocation control information per transmission point group can be located in the intrinsic (or specific) control information region of the corresponding transmission point.

(2) Modulation and Coding Scheme (MCS) Related Control Information

A method for configuring MCS related control information can be varied depending on whether a single MCS or an intrinsic (or specific) MCS per individual transmission point is applied to PDSCH transmission of full transmission points. In this embodiment, it is supposed that common MCS related information exists within a random transmission point group for action of downlink CoMP.

For configuration of effective control information, it is preferable that a common MCS value for PDSCH transmission is allocated to each transmission point group. At this time, the MCS related control information can be configured as the Tx point common control information.

On the other hand, for gain through individual link adaptation per transmission point group, the MCS related control information of the reference transmission point can be located in the Tx point common control information region or the reference transmission point (Tx point #0) intrinsic (or specific) control information region, and offset information (that is, information on delta of the MCS value of the reference transmission point) on delta of the MCS value on the other transmission points or full MCS related control information per transmission point can be located in the corresponding transmission point intrinsic (or specific) control information region.

(3) Hybrid Automatic Repeat Request (HARQ) Related Control Information

Basically, examples of HARQ related control information on PDSCH transmission include a HARQ process number, a new data indicator (NDI), and redundancy version (RV). When the aforementioned examples are defined as the HARQ related control information, if downlink CoMP is used, a method for configuring HARQ related control information according to this embodiment can be varied depending on whether single HARQ related control information or individual HARQ related control information per transmission point is applied to PDSCH transmission of full transmission points.

In this embodiment, it is supposed that HARQ related process within a random transmission point group for action of downlink CoMP is synchronized. In other words, it is supposed that HARQ related information within a random transmission point group is common for transmission points belonging to the group.

In this embodiment, for configuration of effective control information, it is preferable that common HARQ related information for PDSCH transmission is allocated to each transmission point. At this time, the common HARQ related control information can be configured as the Tx point common control information.

However, if an independent HARQ process is used by an independent packet scheduler per transmission point group, since expected gain is great, the HARQ related control information of the reference transmission point can be located in the Tx point common control information region or the transmission point group (Tx point group #0) intrinsic (or specific) control information region including the reference transmission point, and offset information (that is, information on delta of values for the reference transmission points per field of the HARQ related control information of the reference transmission point) on delta of HARQ value on the other transmission points with respect to the HARQ related control information of the reference transmission point can be located in the individual transmission point intrinsic (or specific) control information region.

Also, the full HARQ related control information per transmission point group may be located in the individual transmission point intrinsic (or specific) control information region.

(4) Precoding Matrix Index (PMI) Control Information

For application of downlink CoMP, a MIMO precoding type through a precoding matrix can be used. At this time, a PMI among full transmission points or transmission points can be expressed as either a random PMI value defined in view of the number of full transmitting antennas defined in the system or a random PMI applied randomly by the base station. In a transmission system of this downlink CoMP, a sub-rank of column vectors is allocated from a random PMI value, which is applied to full transmission, to the individual transmission point group.

The applied PMI value can be located in the Tx point common control information region, and stream indication information per transmission point can be located in the corresponding region as the Tx point common control information together with explicit indication or implicit indication (that is, method for arranging stream indication information based on the order of indexes among transmission points) of the transmission point. Unlike this, the PMI value may not be transmitted separately, and stream indication information per transmission point can be located in the corresponding region as the Tx point common control information together with explicit indication or implicit indication (that is, method for arranging stream indication information based on the order of indexes among transmission points) of the transmission point. Also, a total of streams may be located as the Tx point common control information and stream indication information per transmission point may be located in the control information region with respect to the individual transmission point.

As a method for the explicit indication, stream indexes or stream ordering may directly be defined as a field. The number of streams used for transmission per transmission point is defined in the common control information region or the individual control information region as the method for explicit indication, and as a method for the implicit indication, stream indexes may be designated in due order as much as the number of streams per transmission point in accordance with the index order among the transmission points involved in transmission.

As a method for application of another type PMI on the downlink CoMP, a PMI used for MIMO transmission under a single cell non-CoMP status per transmission point group can be applied to PDSCH transmission per transmission point group. In this CoMP method, the PMI value per transmission point group can basically be indicated to the mobile station through the Tx point group intrinsic (or specific) control information region. If another PMI value is transmitted through precoding to a reference signal for data demodulation, a separate PMI value is not needed to be indicated, and a total of streams for CoMP transmission, the number of streams per transmission point, or indexes of the streams per transmission point can be transmitted to the common control information region or the individual control information region.

As another method different form the aforementioned method, the PMI value can be located in the corresponding region together with explicit indication or implicit indication (that is, method for arranging stream indication information based on the order of indexes among transmission points) of the transmission point. Unlike this, the PMI value may not be transmitted separately, and stream indication information per transmission point can be located in the corresponding region as the Tx point common control information together with explicit indication or implicit indication (that is, method for arranging stream indication information based on the order of indexes among transmission points) of the transmission point. Also, a total of streams may be located as the Tx point common control information and stream indication information per transmission point may be located in the control information region with respect to the individual transmission point.

As a method for the explicit indication, stream indexes or stream order may directly be defined as a field. The number of streams used for transmission per transmission point is defined in the common control information region or the individual control information region as the method for explicit indication, and as a method for the implicit indication, stream indexes may be designated in due order as much as the number of streams per transmission point in accordance with the index order among the transmission points involved in transmission.

(5) Active Set Indication

The mobile station may be indicated identifiers of transmission points involved in downlink CoMP. In this case, information of the identifiers is defined as an active set of the corresponding CoMP transmission. This information may be set cell-specifically or differently per user equipment. Elements constituting the information may be values of intrinsic (or specific) cell ID of the transmission point, and may be configured as index of information obtained through ordering of cell IDs among logical or virtual transmission points on the full active set, a series of rules, or equation.

This information can basically be configured in such a manner that full information of index values corresponding to identifiers of the transmission points on the active set in the control information on the PDCCH is defined as the Tx point common control information. Also, full ID (or index) values on the active set with respect to the reference transmission point are transmitted through the Tx point intrinsic (or specific) control information region or a random transmission point intrinsic (or specific) control information region designated as the reference transmission point, and a relative offset value of ID (or index) value of the other individual transmission point with respect to the full ID values can be located in the individual transmission point group intrinsic (or specific) control information region.

With respect to a series of indication methods including the aforementioned suggestions, candidate information of the transmission point groups that can be involved in downlink CoMP can be transmitted previously as cell-specific system information through higher layer signaling (that is, radio resource control signaling) or user equipment-specific higher layer signaling (radio resource control signaling).

For identification of the active set per transmission point on the PDCCH, the aforementioned information can be used as a reference of logical index. In the mean time, the number of transmission points (that is, the number of elements of the active set) involved in CoMP may only be indicated without separate designation on the Tx point common control information region, and index information of the transmission point of the corresponding active set on the transmission point intrinsic (or specific) control information region can be indicated.

(6) Other Control Information

In accordance with the detailed method of downlink CoMP, transmission power control (TPC) command information on the PUCCH, PMI confirmation information, and localized/distributed flag information can be transmitted as the Tx point common control information, or can be transmitted to the user equipment through the individual transmission point intrinsic (or specific) control information region to ensure individual independence for resource allocation, link adaptation and PMI application between the transmission points.

In configuring a random downlink control information (DCI) format by means of application of suggested methods of the Tx point common control information, the transmission point intrinsic (or specific) control information, or hybrid type Tx point common control information and transmission point intrinsic (or specific) control information, as suggested on the individual control information that can be transmitted through the PDCCH, the suggested details per control information suggested as above can independently be applied per control information. Accordingly, a full DCI format of PDCCH transmission on the reference transmission point of the corresponding downlink CoMP can be configured through combination of the suggested details, and can also be applied to PDCCH transmission of another type downlink CoMP.

Embodiment 3

This embodiment suggests a method for configuring Tx point common control information with N transmission points as a method for configuring control information on a PDCCH for downlink CoMP.

Figure 5:
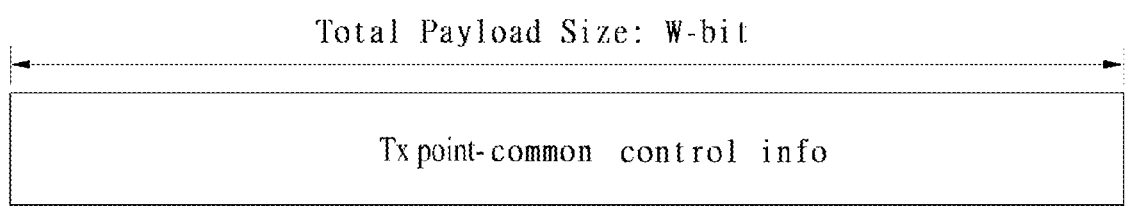
FIG. 5 is a diagram illustrating a structure of control information on a PDCCH in a CoMP system including N transmission points according to the embodiment 3 of the present invention.

FIG. 5 is a diagram illustrating a structure of control information on a PDCCH in a CoMP system including N transmission points according to the embodiment 3 of the present invention.

In this embodiment, the control information described in the aforementioned embodiments 1 and 2 is configured as the Tx point common control information. In a detailed method for transmitting a PDSCH of downlink CoMP according to this embodiment, resource allocation control information between transmission points, MCS related control information and HARQ related control information can be configured as the Tx point common control information. Accordingly, it is supposed that PDSCH transmission on a plurality of transmission points based on common resource allocation and common link adaptation is performed and synchronization in confirmation and retransmission mode on HARQ process between the transmission points is performed.

In addition, as additional resource mapping and PMI application described in the present invention and TPC related control information are common for the transmission points, synchronization can be performed in PDSCH transmission on the plurality of transmission points.

One DCI format can be configured on the basis of this embodiment in such a manner that DCI format to CoMP mode indication according to the existing non-CoMP transmission and/or indication of CoMP active set are additionally provided. This is based on increase of payload size on the limited DCI format.

In the mean time, if CoMP indication and/or indication of the CoMP active set are not additionally provided, it is not required that additional DCI format is defined with respect to downlink CoMP transmission.

Among the suggested methods according to the present invention, the methods of the embodiments 1 and 2 can be applied, in combination, to the individual control information constituting the DCI format of the PDCCH for downlink CoMP. In other words, a random one of the method described in the embodiment 1 and the method described in the embodiment 2 can be set by a specific reason with respect to the control information transmitted through the PDCCH for downlink CoMP, and a full DCI format can be configured by combination of the individual control information.

Also, in downlink CoMP transmission based on a random one of the methods suggested in the present invention and PDCCH control information based on the downlink CoMP transmission, to stably provide an effective code rate with respect to increase of DCI format payload, a separate CCE aggregation level based on CCEs more than a CCE aggregation level 1 applied to the PDCCH related to the existing non-CoMP transmission is additionally defined on the existing non-CoMP transmission, whereby the separate CCE aggregation level can be used for PDCCH transmission of the corresponding CoMP. For example, supposing that a CCE aggregation level applied to a single cell transmission mode not the existing CoMP mode is 1, 2, 4, or 8, a candidate CCE aggregation level of 16 or 32 can additionally be configured to transmit a PDCCH DCI format of the CoMP mode.

Also, load and latency may occur in a process of receiving and decoding a PDSCH and a PDCCH when downlink CoMP is used. In order to solve this problem, as a method associated with or independent from the method of increasing the CCE aggregation level, some of full CCE aggregation levels (including CCE aggregation level additionally defined with respect to PDCCH for CoMP, if any) can be applied to PDCCH transmission for downlink CoMP. Also, for effective position identification on a search space, a CCE search space for downlink CoMP PDCCH transmission can be limited to a fixed CCE region (that can provide one or more candidates) corresponding to the front, the rear, or a random position on a logical CCE column region of full user equipment specific search spaces.

In the present invention, although it has been described that the transmission points constituting downlink CoMP transmit the PDSCH, the method for configuring control information according to the present invention can be applied to even the case that the transmission points except for the reference transmission point do not transmit the PDSCH to the corresponding mobile station and are defined as other ones affecting the corresponding mobile station. In this case, although the method for configuring control information as suggested in the embodiment 3 of the present invention is preferably required, the other methods may not be excluded.

Figure 6:
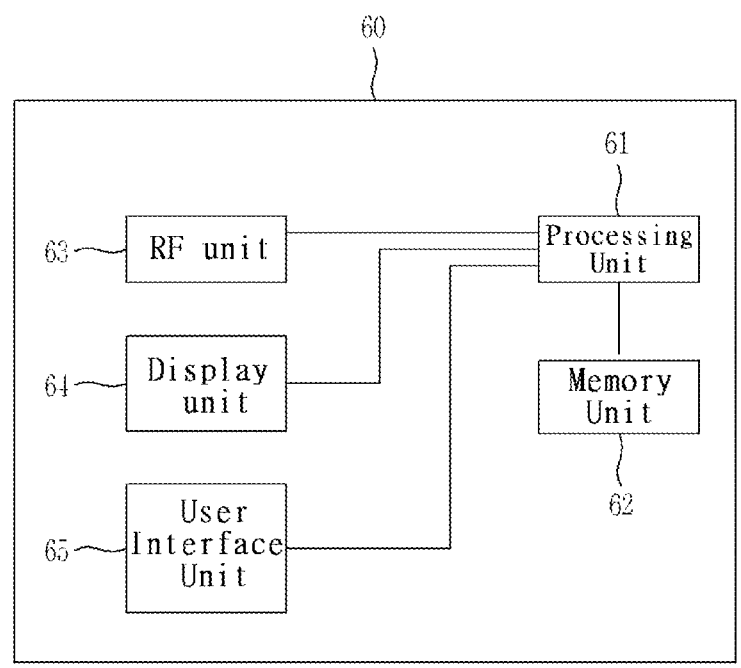
FIG. 6 is a block diagram illustrating a device that can be applied to a user equipment, a relay station or a base station and can perform the present invention.

FIG. 6 is a block diagram illustrating a device that can be applied to a user equipment, a relay station or a base station and can perform the present invention. As illustrated in FIG. 6, a device 60 includes a processing unit 61, a memory unit 62, a radio frequency (RF) unit 63, a display unit 64 and a user interface unit 65. Layers of a physical interface protocol are implemented by the processing unit 61. The processing unit 61 provides a control plane and a user plane. A function of each layer can be implemented by the processing unit 61. The processing unit 61 performs the methods described in the aforementioned embodiments of the present invention. The memory unit 62 is connected with the processing unit 61 and stores an operating system, an application program, and general files therein. If the device 60 is a user equipment (UE), the display unit 64 can display various kinds of information, and can be implemented using LCD (Liquid Crystal Display), OLED (Organic Light Emitting Diode), etc., which are known. The user interface unit 65 can be configured by combination of well known user interfaces such as key pad and touch screen. The RF unit 63 is connected with the processing unit 61 and transmits or receives a radio signal.

In this specification, the base station means a terminal node of a network, which performs direct communication with the mobile station. A specific operation which has been described as being performed by the base station may be performed by an upper node of the base station as the case may be.

In other words, various operations performed for communication with the mobile station in the network which includes a plurality of network nodes along with the base station may be performed by the base station or network nodes other than the base station. At this time, the base station (BS) may be replaced with terms such as a fixed station, Node B, evolved Node B (eNB), an access point (AP), and a relay node which is an uplink receiving entity.

Also, in the present invention, the mobile station corresponds to a user equipment (UE), and may be replaced with terms such as a mobile terminal (MT), a subscriber station (SS), a mobile subscriber station (MSS), and a relay node which is an uplink transmitting entity.

The embodiments according to the present invention can be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention can be used for a mobile station, a base station or other equipment of a wireless mobile communications system.

The invention claimed is:

1. A method for transmitting control information in a wireless communications system supporting coordinated multipoint (CoMP) including N (N>1) transmission points, the method comprising:
grouping the N transmission points into M transmission point groups;

collecting, at a reference transmission point among the N transmission points, generated control information for downlink transmission of M (M<N) transmission point groups; and transmitting, at the reference transmission point, the collected control information to a user equipment, wherein the control information includes M transmission point groups intrinsic control information regions, and wherein the M transmission point groups are grouped based on whether to use the same control information.

2. The method according to claim 1, wherein the control information further includes a transmission point common control information region.

3. The method according to claim 2, wherein the control information on the reference transmission point is included in the transmission point common control information region or a reference transmission point control information region, and each of M−1 control information regions includes offset information related to a difference with intrinsic control information of a group including the reference transmission point.

4. The method according to claim 1, wherein the control information is one of resource allocation control information, MCS (Modulation and Coding Scheme) level, HARQ (Hybrid Automatic Repeat reQuest) related information, PMI (Precoding Matrix Index) control information, and information on a transmission point involved in the CoMP among the N transmission points.

5. The method according to claim 1, wherein the control information is transmitted through a physical downlink control channel (PDCCH).

6. The method according to claim 4, wherein the M transmission point groups are grouped when at least one of the control information is used in common.

7. The method according to claim 3, wherein the difference of control information is at least one of a difference of a location or size of a resource block, MCS value, HARQ value and PMI value of the other transmission point groups from the reference transmission point.

* * * * *